(12) United States Patent
Liu et al.

(10) Patent No.: US 6,927,796 B2
(45) Date of Patent: Aug. 9, 2005

(54) CMOS IMAGE SENSOR SYSTEM WITH SELF-RESET DIGITAL PIXEL ARCHITECTURE FOR IMPROVING SNR AND DYNAMIC RANGE

(75) Inventors: Xinqiao Liu, Palo Alto, CA (US); Suk Hwan Lim, Palo Alto, CA (US); Abbas El Gamal, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 652 days.

(21) Appl. No.: 09/962,804

(22) Filed: Sep. 24, 2001

(65) Prior Publication Data

US 2003/0058360 A1 Mar. 27, 2003

(51) Int. Cl.$^7$ ............................................... H04N 5/335
(52) U.S. Cl. ...................... 348/297; 348/308; 348/294
(58) Field of Search ............................... 348/308, 297, 348/294, 241, 248, 572; 250/208.1

(56) References Cited

U.S. PATENT DOCUMENTS

| | | | |
|---|---|---|---|
| 5,153,421 A | 10/1992 | Tandon et al. ............ 250/208.1 |
| 5,272,535 A | 12/1993 | Elabd ..................... 358/213.11 |
| 5,461,425 A | 10/1995 | Fowler et al. .............. 348/294 |
| 5,583,367 A | 12/1996 | Blossfeld ................... 257/426 |
| 5,742,047 A | 4/1998 | Buhler et al. .............. 250/214 |
| 5,786,582 A | 7/1998 | Roustaei et al. ............ 235/462 |
| 5,801,657 A | 9/1998 | Fowler et al. .............. 341/155 |
| 5,818,052 A | 10/1998 | Elabd .................... 250/370.09 |
| 5,841,126 A | 11/1998 | Fossum et al. .......... 250/208.1 |
| 5,844,514 A | 12/1998 | Ringh et al. ................ 341/143 |
| 5,900,623 A | 5/1999 | Tsang et al. ................ 250/208 |
| 5,943,388 A | 8/1999 | Tumer ...................... 378/98.9 |
| 5,959,291 A | * 9/1999 | Jensen .................... 250/214 R |
| 5,969,758 A | 10/1999 | Sauer et al. ................ 348/241 |
| 6,078,037 A | 6/2000 | Both, Jr. .................. 250/208.1 |
| 6,115,065 A | 9/2000 | Yadid-Pecht et al. ........ 348/308 |
| 6,130,423 A | 10/2000 | Brehmer et al. .......... 250/208.1 |
| 6,130,713 A | * 10/2000 | Merrill ....................... 348/308 |
| 6,157,016 A | 12/2000 | Clark et al. .............. 250/208.1 |

OTHER PUBLICATIONS

Liu et al., "Photocurrent Estimation for a Self–Reset CMOS Image Sensor", Standford University, SPIE, vol. 4306.*
X. Q. Liu et al; "Simultaneous image formation and motion blur restoration via multiple capture;" In ICASSP 2001 conference, Salt Lake City, Utah, May 2001 (Presentation).
X. Q. Liu et al.; "Photocurrent estimation from multiple non–destructive samples in a CMOS image sensor;" In Proceedings of the SPIE Electronic Imaging 2001 conference, vol. 4306, San Jose, CA, Jan. 2001. (Presentation).
D. Yang et al.; "Comparative analysis of SNR for image sensors with enhanced dynamic range;" In Proceedings of the SPIE Electronic Imaging 99 conference, vol. 3649, San Jose, CA, Jan. 1999 (Presentation).
B. Fowler et al.; "A method for estimating quantum efficiency for CMOS image sensors;" In Proceedings of the SPIE , vol. 3301, pp178–185, Apr. 1998.

(Continued)

*Primary Examiner*—Tuan Ho
*Assistant Examiner*—Brian Jelinek
(74) *Attorney, Agent, or Firm*—Lumen Intellectual Property Services, Inc.

(57) ABSTRACT

A CMOS DPS image sensor architecture for improving SNR and dynamic range is presented. The CMOS DPS architecture includes self-reset digital pixels capable of collecting more charge than the physical well capacity. A method for improving SNR without reducing dynamic range in a CMOS video sensor system under low illumination is described, wherein the CMOS video sensor system employing self-reset DPS architecture includes pixel level A/D conversion and wherein each DPS pixels is capable of resetting itself whenever a corresponding diode reaches saturation during integration time.

20 Claims, 7 Drawing Sheets

OTHER PUBLICATIONS

D. Yang et al.; "A nyquist rate pixel level ADC for CMOS image sensors;" In IEEE Journal of Solid State Circuits, vol. 34 No. 3, p. 348–356, Mar. 1999.

B. Fowler et al.; Techniques for pixel–level analog–to–digital conversion; In Proceeding of SPIE, Infrared Readout Electronics IV, pp 2–12, vol. 3360, Orlando, Apr. 1998. (Presentation).

S. Kleinfelder et al.; "A 10,000 frames/s 0.18 um COMS digital pixel sensor with pixel–level memory;" In Proceeding of the 2001 IEEE International Solid–State Circuits Conference, pp. 88–89, San Francisco, CA, Feb. 2001. (Presentation).

A. El Gamal et al.; "Modeling and estimation of FPN components in CMOS image sensors;" In Proceedings of SPIE, vol. 3301, pp. 168–177, Apr. 1998.

A. El Gamal et al.; "Pixel level processing–why, what and how?;" In Proceedings of the SPIE Electronic Imaging 99 conference, vol. 3650, Jan. 1999. (Presentation).

H. Tian et al.; "Analysis of temporal noise in CMOS photodiode active pixel sensor;" In IEEE Journal of Solid State Circuits, vol. 36, No. 1, pp. 92–101, Jan. 2001.

D. Yang et al.; "A 128×128 pixel CMOS area image sensor with multiplexed pixel level A/D conversion;" In IEEE 1996 Custom Integrated Circuits Conference, San Diego, CA, May 1996.

D. Yang et al.; "A 640×512 CMOS image sensor with ultra wide dynamic range floating–point pixel–level ADC;" In IEEE Journal of Solid State Circuits, vol. 34, No. 12, p. 1821–1834, Dec. 1999.

Woodward Yang et al.; "An integrated 800×600 CMOS Imaging system;" ISSCC99/Session 17/Paper WA 17.3; 1999 IEEE International Solid–State Circuits Conference.

Hon–Sum Philip Wong et al.; "CMOS active pixel image sensors fabricated using a 1.8–V, 0.25–um CMOS technology;" IEEE Transactions on Electron Devices, vol. 45, No. 4, Apr. 1998.

Hon–Sum Wong; "Technology and device scaling considerations for CMOS imagers;" IEEE Transactions on Electron Devices, vol. 43, No. 12, Dec. 1996.

Peter Centen; "CCD on–chip amplifiers: noise performance versus MOS transistor dimensions;" IEEE Transaction on Electron Devices, vol. 38 No. 5 May 1991.

Steven Decker et al.; "A 256×256 CMOS imaging array with wide dynamic range pixels and column–parallel digital output;" IEEE Journal of Solid–State Circutts, vol. 33, No. 12, Dec. 1998.

* cited by examiner

CMOS IMAGE SENSOR SYSTEM WITH SELF-RESET DIGITAL PIXEL ARCHITECTURE FOR IMPROVING SNR AND DYNAMIC RANGE

CROSS-REFERENCE TO RELATED APPLICATIONS

This application relates to a co-pending U.S. patent application Ser. No. 09/961,847 filed on Sep. 24, 2001 and entitled "METHOD FOR IMPROVING SNR IN LOW ILLUMINATION CONDITIONS IN A CMOS VIDEO SENSOR SYSTEM USING A SELF-RESETTING DIGITAL PIXEL". This application also relates to U.S. patent application Ser. No. 09/992,479, filed on Nov. 13, 2001, entitled "PHOTOCURRENT ESTIMATION FROM MULTIPLE CAPTURES FOR SIMULTANEOUS SNR AND DYNAMIC RANGE IMPROVEMENT IN CMOS IMAGE SENSORS", and U.S. patent application Ser. No. 09/992,480, filed on Nov. 13, 2001, entitled "MOTION/SATURATION DETECTION SYSTEM AND METHOD FOR SYNTHESIZING HIGH DYNAMIC RANGE MOTION BLUR FREE IMAGES FROM MULTIPLE CAPTURES", all of which are assigned to the same assignee as the present application and are hereby incorporated herein by reference.

BACKGROUND OF THE INVENTION

1. Field of the Invention

The present invention relates generally to digital pixel sensor architecture and, more particularly, to complementary metal oxide semiconductor (CMOS) image sensor systems with self-reset digital pixel sensor architecture for improving signal-to-noise ratio (SNR) and extending dynamic range thereof.

2. Description of the Related Art

An image sensor converts an optical image focused on the sensor into electrical signals. The electrical signals represent the intensity of the image. Replacing earlier vidicon tube type image sensing devices, charge-coupled device (CCD) image sensors have become the core technology of modern imaging devices such as digital cameras.

CCD sensors have many strengths, including small size, high sensitivity, and high fill factor. However, CCD sensors also have many weaknesses, including limited readout rates and limited dynamic range. The most well known weakness is the difficulty and high costs of integrating CCD image sensors with CMOS-based microprocessors. CMOS-based integrated circuit (IC) chips containing a CCD image sensor usually have a relatively low yield and are quite expensive because of the specialized processing involved.

CCD image sensors are well known in the art and thus are not described herein. An exemplary teaching can be found in U.S. Pat. No. 5,272,535, which is incorporated herein by reference, titled "Image Sensor with Exposure Control, Selectable Interlaced, Pseudo Interlaced or Non-Interlaced Readout and Video Compression", issued to Elabd of Sunnyvale, Calif., and assigned to Loral Fairchild Corporation, Syosset, N.Y., December 1993.

The CMOS technology provides the possibility of integrating image sensing and digital signal processing on the same chip, which has been widely accepted as the main advantage over CCD image sensors. The CMOS image sensors have the potential of replacing the CCD image sensors, just as CCD image sensors replaced the vidicon tube image sensing devices.

The current CMOS technology offers smaller, less expensive, and lower power image sensing devices. The advantages of CMOS image sensors over CCD image sensors are well known. An exemplary teaching, which is incorporated herein by reference, can be found in "Technology and Device Scaling Considerations for CMOS Imagers", IEEE Transactions on Electron Devices, Vol. 43, No. 12, December 1996, disclosing several advantages of CMOS image sensors, including:

1) Low-voltage operation and low power consumption;
2) Compatibility with on-chip electronics integration (control logic and timing, image processing, and signal-conditioning such as analog-to-digital (A/D) conversion);
3) Random access of image data; and
4) Potentially lower cost as compared to conventional CCD image sensors.

Current CMOS image sensors come in several different types of pixel architectures, such as the passive pixel sensor (PPS) architecture, the active pixel sensor (APS) architecture, and the recently introduced digital pixel sensor (DPS) architecture.

PPS and APS are well known in the art and thus are not described herein. Exemplary teachings, which are incorporated herein by reference, can be found in U.S. Pat. No. 5,841,126, titled "CMOS Active Pixel Sensor Type Imaging System on A Chip", issued to Fossum et al. of California and assigned to California Institute of Technology, November 1998, and "CMOS Active Pixel Image Sensors Fabricated Using a 1.8-V, 0.25-$\mu$m CMOS Technology", IEEE Transactions on Electron Devices, Vol. 45, No. 4, April 1998, by Wong et al.

The digital pixel sensor incorporates A/D conversion at the pixel level. It is known in the art that A/D conversion can be integrated at the chip level, at the column level, or at the pixel level. The chip level approach is so far the most commonly used, wherein a single conventional high-speed analog-to-digital converter (ADC) is integrated with an image sensor.

To lower the ADC operating speed, the column level approach is used. In this case, an array of ADC's, each dedicated to one or more columns of the sensor array, is employed. The ADC's are operated in parallel, and, therefore, low-to-medium-speed ADC architectures can be employed.

To lower the ADC speeds even further, the pixel level digitization is used. In this approach, an ADC is dedicated for each pixel or each group of neighboring pixels and the ADC's are operated in parallel.

Exemplary teachings on CMOS image sensor architectures employing different approaches, including the pixel level A/D conversion approach, can be found in the following publications, which are all hereby incorporated herein by reference:

1. U.S. Pat. No. 5,461,425, titled "CMOS Image Sensor with Pixel Level A/D Conversion", issued to Fowler et al. and assigned to Stanford University in Palo Alto, Calif., October 1995.
2. David Yang, Boyd Fowler, and Abbas El Gamal, "A 128×128 Pixel CMOS Area Image Sensor with Multiplexed Pixel Level A/D conversion", IEEE CICC96, 1996.
3. Boyd Fowler, Abbas El Gamal, and David Yang, "Techniques for Pixel Level analog to Digital Conversion", SPIE, Infrared Readout Electronics IV, Proceedings, Vol. 3360, pp. 2–12, April 1998.
4. U.S. Pat. No. 5,801,657, titled "Serial analog-to-Digital Converter Using Successive Comparisons", issued to Fowler et al. and assigned to Stanford University in Palo Alto, Calif., September 1998.

5. U.S. Pat. No. 5,818,052, titled "Low Light Level Solid State Image Sensor", issued to Elabd of Sunnyvale, Calif., and assigned to Loral Fairchild Corp., Syosset, N.Y., October 1998.

6. U.S. Pat. No. 5,844,514, titled "Analog-to-Digital Converter And Sensor Device Comprising Such A Converter", issued to Ringh et al. and assigned to Forsvarets Forskningsanstalt in Stockholm, Sweden, December 1998.

7. Abbas El Gamal, David Yang, and Boyd Fowler, "Pixel Level Processing—Why, What, and How?", SPIE Electronic Imaging '99 Conference, Proceedings, Vol. 3650, January 1999.

8. Woodward Yang et al., "An Integrated 800×600 CMOS Imaging System", IEEE ISSCC99, Session 17, WA 17.3, February 1999.

9. David Yang, Abbas El Gamal, Boyd Fowler, and Hui Tian, "A 640×512 CMOS Image Sensor with Ultra Wide Dynamic Range Floating-Point Pixel-Level ADC", IEEE ISSCC99, Session 17, WA 17.5, February 1999.

10. David Yang, Boyd Fowler, and Abbas El Gamal, "A Nyquist-Rate Pixel-Level ADC for CMOS Image Sensors", IEEE J. of Solid-State Cir., Vol. 34, No. 3, March 1999.

11. Stuart Kleinfelder, Suk Hwan Lim, Xinqiao Liu, and Abbas El Gamal, "A 10,000 Frames/s 0.18 $\mu$m CMOS Digital Pixel Sensor with Pixel-Level Memory", 2001 IEEE Int. Solid-State Cir. Conf., proceedings, February 2001.

As known in the art and described in these publications, the DPS architecture having pixel level A/D conversion offers the potential of achieving the highest SNR and the lowest power consumption since it is performed in parallel, close to where the signals are generated, and can be operated at very low speeds.

In addition, the DPS architecture offers better scaling with CMOS technology due to reduced analog circuit performance demands and the elimination of column fixed-pattern noise (FPN) and column readout noise. In addition, the same pixel and ADC design and layout can be readily used for a very wide range of sensor sizes. The non-destructive, high frame rate advantages of DPS benefit traditional high speed imaging applications and enabling new imaging enhancement capabilities such as multiple sampling for increasing sensor dynamic range.

However, pixel level A/D conversion implementations must meet stringent area and power requirements. For example, as described in above-referenced article, "A 10,000 Frames/s 0.18 $\mu$m CMOS Digital Pixel Sensor with Pixel-Level Memory", achieving acceptable pixel sizes using DPS architecture requires the use of a 0.18 $\mu$m or smaller CMOS process, which is challenging due to reduced supply voltages and increased leakage currents.

As a result, most CMOS image sensor systems currently available on the market employ an APS architecture that is implemented with chip or column level ADC's.

Unfortunately, CMOS APS image sensors are usually noisier than CCD image sensors. In other words, CMOS APS image sensors generally suffer from limited dynamic range and poor SNR, limiting their use in most image sensor and higher-end video applications. This noise can be reduced but it takes extra processing power, which in turn requires more parts or a more complex IC—negating the reason for using CMOS image sensor in the first place.

To overcome the problem of limited dynamic range in CMOS APS image sensors, a self reset pixel architecture has been proposed in U.S. Pat. No. 6,130,713, issued to Merrill of Woodside, Calif., and assigned to Foveonics, Inc., in Cupertino, Calif.

In Merrill, the dynamic range of a conventional CMOS APS cell is extended. This is achieved by adding circuitry to the convention CMOS APS cell, enabling it to repeatedly reset itself and store the number of times the APS cell has been reset.

The dynamic range of an APS cell is commonly defined by the ratio of the maximum number of photons that the cell can collect during an integration period without saturation, i.e., without exceeding the physical well capacity of the APS cell, and a minimum number of photons that the APS cell can collect during the integration period that can be detected over the noise floor.

To improve the dynamic range, Merrill proposed the following. During an integration period a transistor functioning as a comparator compares the voltage level of an APS cell with a reference voltage. Once the voltage level of the APS cell exceeds the reference voltage level, a reset circuit resets the APS cell's photodiode. After each reset, a reset value is stored in a memory circuit. The sum of the reset values stored in the memory circuit corresponds to the number of times the APS cell has been reset.

FIG. 1 shows a schematic drawing of a prior art self reset APS architecture wherein an image cell 100 includes a photodiode D1; a reset transistor T9; a level shifter between voltage supply VDD1 and reference voltage supply VDD2, formed by transistors T10–T12; a first inverter circuit IV1; a second inverter circuit IV2; and analog memory circuit 103 formed by transistor T6 and capacitor C1; and source follower transistors T13, T14 and select transistors T16, T15 which provide information to respective high and low order bit information lines 101, 102.

In this prior art architecture, an image integration of the image cell 100 begins with an application of a reset voltage $V_{RT}$ from node N2 to the gate of reset transistor T9. After reset, the image cell 100 is then read to obtain a reset value that represents the initial integration voltage on photodiode D1 less a threshold voltage drop of buffer transistor T13.

Once the initial reset value is obtained, the integration voltage on D1 increases with time during the integration period. When the circuitry in image cell 100 senses that the integration voltage is approaching the saturation level of the image cell 100, the reset transistor T9 resets the image cell 100 to begin a second integration period.

The image cell 100 determines when the integration voltage of image cell 100 is approaching the saturation level by comparing the integration voltage with a reference voltage. Once the integration voltage exceeds the reference voltage, transistor T9 resets the image cell 100. The image cell 100 can be reset many times. The number of times the image cell 100 has been reset is stored in memory circuit 103.

This prior art self reset APS sensor architecture suffers from the following drawbacks:

1. There is no reset mechanism for the analog memory circuit 103. Specifically, there is no mechanism to reset capacitor C1 of the analog memory circuit 103 when continuous operation is required.

The analog memory circuit 103 keeps track of the number of times the image cell 100 has been reset by storing a unit of charge on the capacitor C1 every time a reset is executed. Without a reset mechanism, the capacitor C1 will saturate in video applications that require the image cell to work continuously. When the capacitor C1 is saturated, the analog memory circuit 103 will not be able to count the number of self-reset.

2. One saturated active pixel cell may trigger undesirable reset of an entire array of active pixel cells.

As described above and with reference to FIG. 1, the active pixel cell, i.e., the image cell 100, begins cell integration with an application of a reset voltage $V_{RT}$ from node N2 to the gate of reset transistor T9. After reset, the image cell 100 is then read to obtain a reset value that represents the initial integration voltage on photodiode D1 less a threshold voltage drop of buffer transistor T13.

In other words, each active pixel cell is first reset and then read to obtain an initial reset value. This indicates that every active pixel cell begins integration with a global reset signal being applied to each active pixel cell's N2 node. As such, this global reset would connect an array of active pixel cells together. In essence, every node N2 in each of the active pixel cells in the array is connected to one another via the global reset.

After the first reset and during integration, when one image cell approaches saturation, its self reset circuit generates a high voltage signal, i.e., a reset signal, on the same node N2 to reset its own photodiode. Since all active pixel cells' N2 nodes are connected together via the global reset, this means that, when one of them resets, it would also trigger the entire array of active pixel cells to be reset accordingly. This is not desirable.

3. The reference voltage supply circuit VDD2 is unstable and thus may trigger false self-reset.

As shown in FIG. 1, both inverters, IV1 and IV2, are connected to the reference voltage supply circuit VDD2. When the first inverter circuit IV1, consisting of PMOS transistor T2 and NMOS transistor T5, is turned on, it outputs a low voltage signal at node N4. In turn, the second inverter circuit, consisting of PMOS transistor T3 and NMOS transistor T6, outputs a high voltage signal at node N2. This high voltage signal is the reset voltage $V_{RT}$ that turns on the reset transistor T9.

Since the reference voltage supply circuit VDD2 is closely connected to both inverter circuits IV1 and IV2, each time an inverter switching occurs, the reference voltage supply circuit VDD2 is inevitably disturbed. Because the reference voltage supply circuit VDD2 is affected by inverter switching and thus unstable, false self reset may be triggered.

4. By adding circuitry to a conventional active pixel cell, this prior art self reset APS architecture provides an undesirably large active pixel cell that still suffers from poor SNR and other drawbacks commonly found in CMOS APS implementations.

BRIEF SUMMARY OF THE INVENTION

Accordingly, it is a primary object of the present invention to provide a novel CMOS self-reset DPS architecture that overcomes weaknesses and drawbacks of prior art image sensing devices and systems.

It is also an object of the present invention to provide novel CMOS self-reset DPS image sensor apparatuses and systems for increasing SNR without reducing dynamic range.

It is an object of the present invention to provide a novel self-reset DPS architecture for improving SNR and extending dynamic range, wherein said DPS architecture capable of capturing multiple pixel samples during a single integration.

It is another object of the present invention to provide a method for simultaneously improving dynamic range and signal-to-noise ratio in a CMOS image sensor system employing self-reset DPS architecture.

It is yet another object of the present invention to provide a self-reset digital pixel sensor (DPS) comprising a diode capable of collecting more charge than physical well capacity of said DPS, a feedback circuit capable of affecting self-resets during an integration period whenever the diode reaches saturation, a pixel level analog-to-digital converting means, a memory means for storing digitized pixel value, and a comparing means for facilitating self-reset and analog-to-digital conversion (A/D).

It is another object of the present invention to provide a method for simultaneously improving dynamic range and SNR in a CMOS image sensor system with self-reset DPS architecture, the method comprising the steps of capturing multiple pixel samples during an integration time, converting at pixel level captured analog pixel sample signals to corresponding digital pixel values, storing the digital pixel values in memory, obtaining at high speed the digital pixel values from the memory, determining number of self-reset occurred during the integration time by analyzing the digital pixel values, determining total charge collected during the integration time by analyzing the number of self-resets, performing linear mean-square-error estimation to reduce noise associated with the capturing step thereby increasing the SNR and extending the dynamic range at low illumination end.

Still another object of the present invention is to provide a method for improving SNR under low illumination without slowing video frame rate in a solid state video sensor system employing self-reset pixels, the method comprising the steps of eliminating global frame reset for the self-reset pixels, extending integration time beyond frame readout time, and generating a frame image using one or more previously stored frames.

Yet another object of the present invention is to provide a method for improving SNR without reducing dynamic range in a CMOS video sensor system with self-reset DPS architecture under low illumination, the method comprising the steps of eliminating global frame reset for the self-reset DPS pixels, capturing and storing a plurality of frames, extending integration time beyond frame readout time, and generating frame images using one or more previously stored frames; the method further comprising steps of determining optimal duration of the extending step by analyzing captured frames and terminating said extending step when dramatic motion is detected thereby preventing severe motion blur.

Still further objects and advantages of the present invention will become apparent to one of ordinary skill in the art upon reading and understanding the following drawings and detailed description of the preferred embodiments. As it will be appreciated by one of ordinary skill in the art, the present invention may take various forms and may comprise various components and steps and arrangements thereof. Accordingly, the drawings are for purposes of illustrating a preferred embodiment(s) of the present invention and are not to be construed as limiting the present invention.

DETAILED DESCRIPTION OF THE INVENTION

Analog circuit design in a mixed signal environment has become more and more challenging as the industry migrates to deep submicron regime. For example, signal swing, the most important factor in determining an image sensor's dynamic range and SNR, is dramatically reduced as technology scales. This is especially evident in APS image sensor implementations where, as power supply voltage reduces, the analog signal swing decreases rapidly. With a small analog signal swing and its associated noise, it is extremely hard to get a typical 8-bit image using an on-chip ADC. The situation for DPS image sensors is better because the ADC is usually substantially closer to the signal source.

There are several known implementations providing sensor dynamic range enhancement, including multiple sampling, i.e., capturing multiple pixel samples, as well as well adjustment schemes. However, these implementations suffer drawbacks such as limited application, e.g., only work for still images, and/or sacrificing SNR for wider dynamic range. By providing a novel solution to improve both the SNR and dynamic range simultaneously in still image and video applications, the present invention overcomes prior art drawbacks and weaknesses.

Photocurrent Estimation

CMOS image sensors are known to be capable of very high frame rate non-destructive readout. This high speed readout capability and the potential of integrating memory and signal processing with the sensor on the same chip enable the implementation of many new imaging applications such as dynamic range enhancement. The idea is to capture several frames during a normal exposure time, i.e., shorter exposure time images capture the brighter areas of the scene while longer exposure time images capture the darker areas of the scene.

In order to combine the captured images into a single high dynamic range image, it has been proposed to appropriately scale each pixel's last sample before saturation. This method, however, can only increase dynamic range at the high illumination end. This is because read noise is not reduced.

We recently proposed, in "Photocurrent Estimation from Multiple Non-Destructive Samples in a CMOS Image Sensor", Proceeding of SPIE, Vol. 4306, San Jose, March, 2001, which is hereby incorporated herein by reference, linear mean-square-error (MSE) estimation algorithms that reduce read noise and thus increase dynamic range at the low illumination end in addition at high illumination end.

Figure 1:
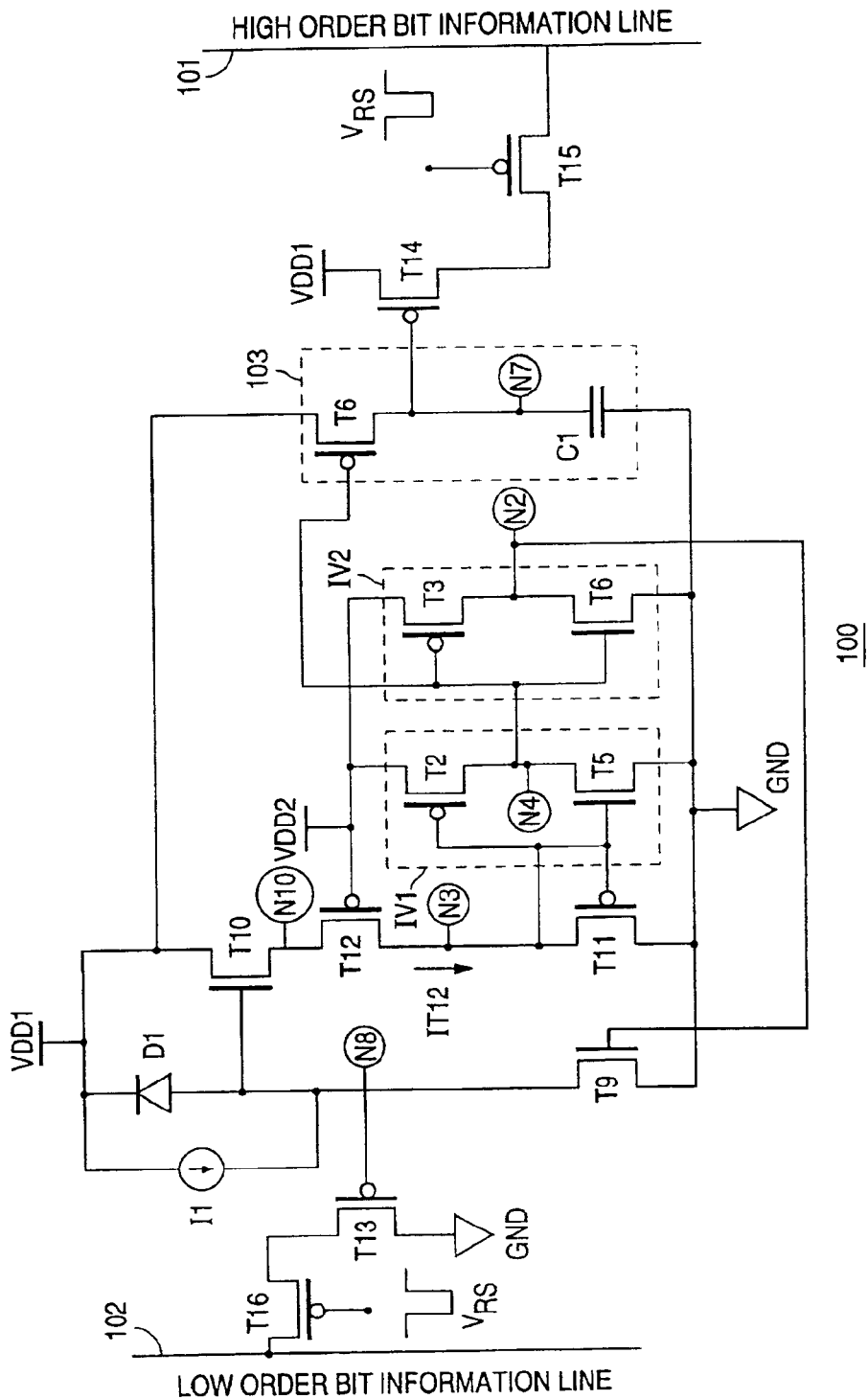
FIG. 1 shows a prior art CMOS self-reset active pixel cell.
Figure 2:
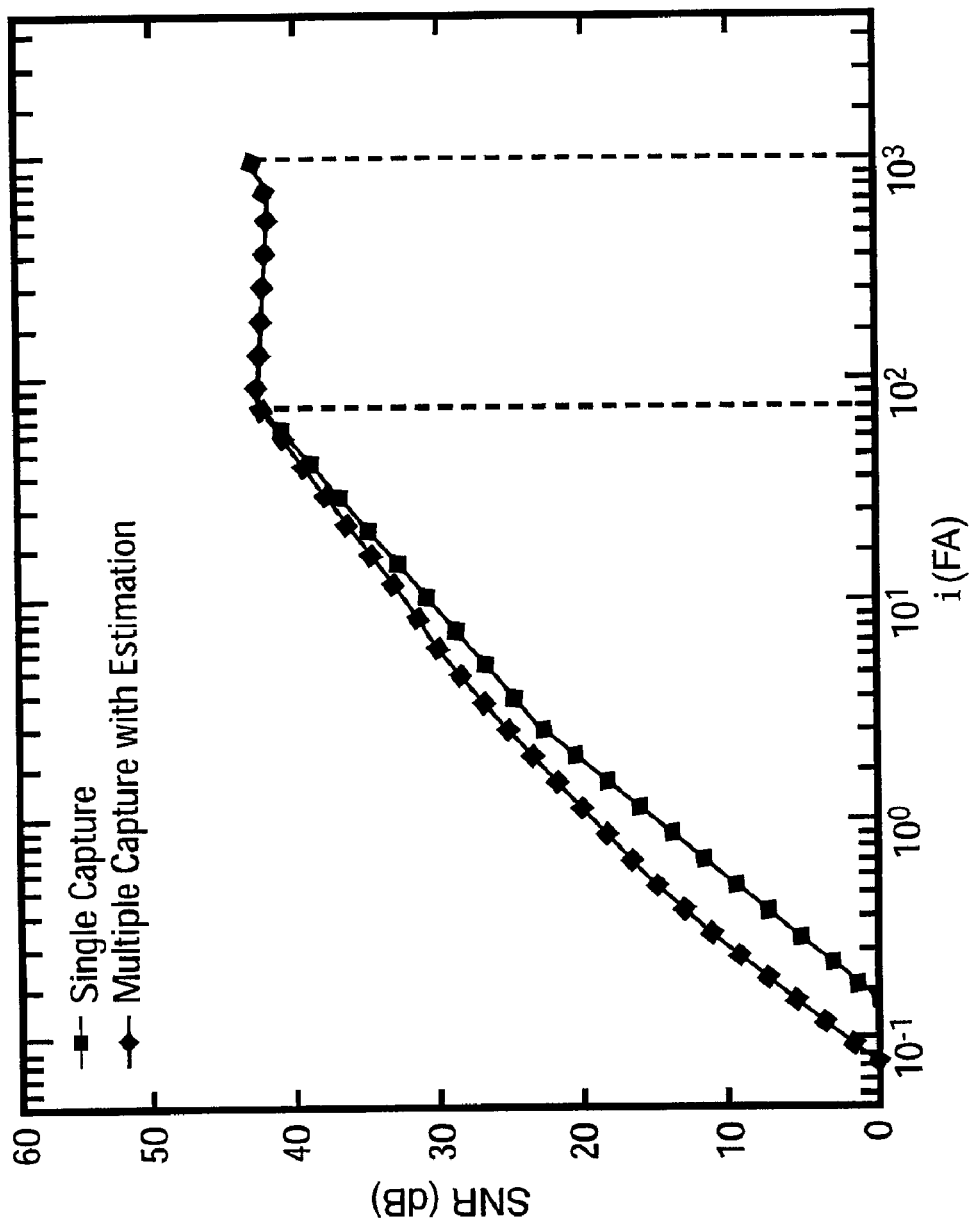
FIG. 2 is a diagram showing SNR and dynamic range enhancement according to an aspect of the present invention.

As shown in FIG. 2, with a well capacity of 18750e$^-$, readout noise of 30e$^-$ and reset noise of 10e$^-$, the dynamic range is extended from 52 dB to 80 dB by applying our linear MSE estimation algorithm to total of 32 samples. The dynamic range is extended 6 dB at low illumination end and 22 dB at high illumination end. More important, with this novel estimation method, the SNR is consistently higher, with a more pronounced 5.5 dB gain at low illumination end.

The fundamental limit on peak SNR, however, is still set by physical well capacity. With the need to reduce pixel size and integrate more functionality with the sensor, CMOS image sensors need to follow the CMOS technology scaling trend. Well capacity, however, decreases with technology scaling as pixel size and supply voltages are reduced. As a result, SNR decreases potentially to the point where even peak SNR is inadequate.

Generally, pixel well capacity can be expressed as:

$$Q_{well} = V_{swing} \times C_{diode}$$

From here, a projected pixel voltage swing can be seen as a function of technology scaling. That is, the diode capacitance $C_{diode}$ decreases along with the pixel size. Therefore, the well capacity $Q_{well}$ is decreased dramatically as technology scales.

Additionally, peak SNR can be expressed as follows:

$$SNR_{peak} = \frac{(Q_{well} - i_{dc}T)^2}{(qQ_{well} + \sigma_V^2 + \sigma_C^2)} \approx \frac{Q_{well}}{q}$$

This presents a peak SNR that approximately equals to $Q_{well}/q$ where $i_{dc}$ is the dark current, $\sigma_v^2$ is the read noise and $\sigma_c^2$ is the reset noise. The approximation is valid when the shot noise term in the denominator is much larger than the read and reset noise terms.

Furthermore, using both the projected pixel dynamic range and peak SNR as a function of technology scaling, we found that at 0.13 $\mu$m technology, the projected peak SNR is less than 30 dB, which is inadequate.

Solving the problems of fixed well capacity and peak SNR deterioration, the present invention provides a well capacity recycling scheme. The basic idea is to recycle the fixed well several times during integration. That is, whenever a pixel reaches saturation, it self-resets and then re-starts integration. With this new scheme, an effective well capacity is essentially:

$$Q_{total} = m \times Q_{well}$$

where m is the number of self-reset occurred duration the integration. Additionally, peak SNR is essentially:

$$SNR_{peak} = \frac{(mQ_{well} - i_{dc}T)^2}{(qmQ_{well} + \sigma_V^2 + m\sigma_C^2)} \approx \frac{mQ_{well}}{q}$$

Since the peak SNR is substantially close to $mQ_{well}/q$, the peak SNR is effectively increased m times.

Self-Reset Digital Pixel Architecture

Figure 3:
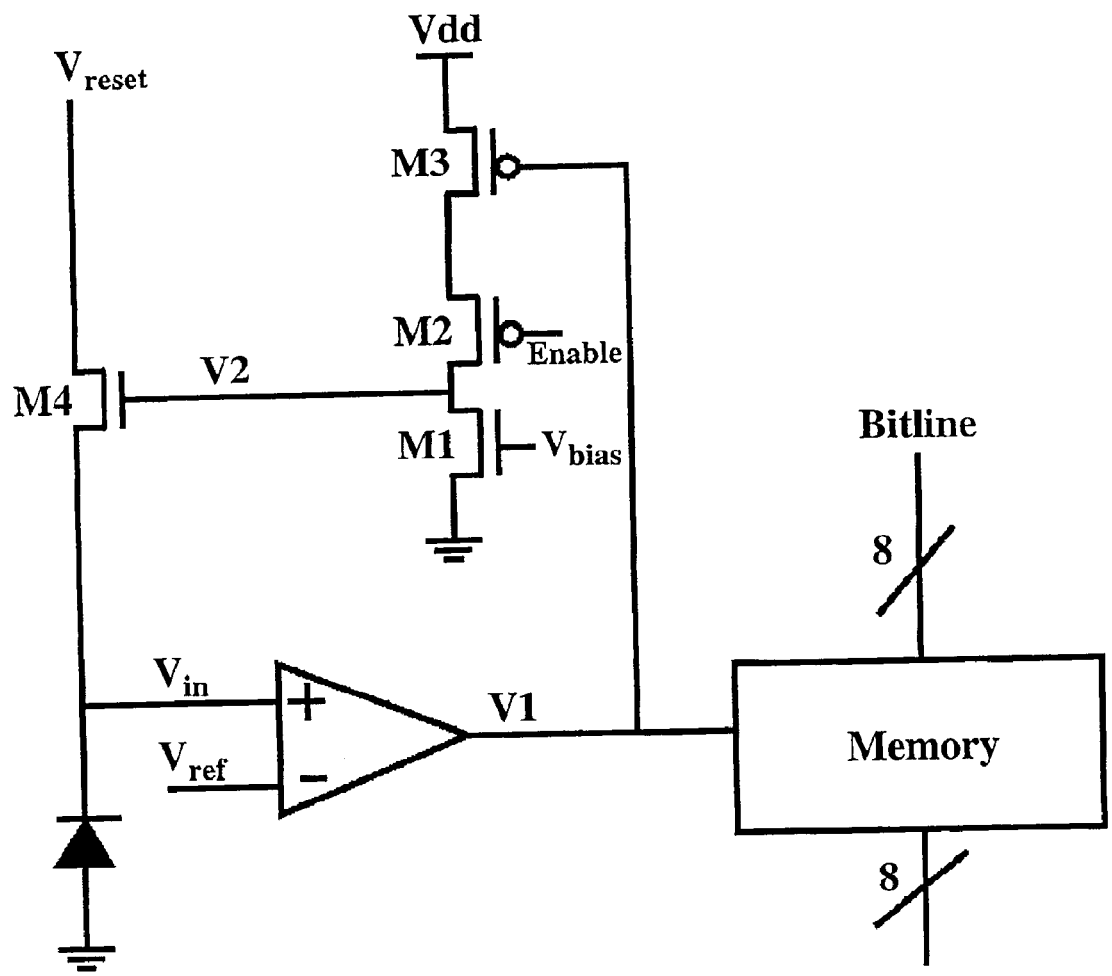
FIG. 3 is a schematic showing a self-reset digital pixel architecture according to a preferred embodiment of the present invention.

Referring now to FIG. 3, a self-reset digital pixel architecture according to a preferred embodiment of the present invention is presented.

As shown in FIG. 3, each pixel contains a photodiode, a comparator, a feedback loop and an 8-bit memory. An exemplary design of the comparator and the memory can be found in the above-referenced and incorporated article, "A 10,000 Frames/s 0.18 $\mu$m CMOS Digital Pixel Sensor with Pixel-Level Memory". Preferably, the memory is an 8-bit 3T dynamic memory such as a 3T DRAM. Alternatively, the memory is a pixel-level digital memory fabricated in a standard digital 0.18 $\mu$m technology. Advantages of pixel-level digital memory include pipelining for faster readout and focal-plane processing.

Additionally, the comparator is preferably capable of providing 10-bits of resolution at an input swing of 1V and worst case settling time of 80 ns. This provides the flexibility to perform 8-bit A/D conversion down to 0.25V range in ~25 µs, which is needed for high-speed, low light operation.

According to an aspect of the present invention, the feedback loop provides self-resetting function. According to a preferred embodiment of the present invention, the feedback loop consists of three transistors: M1, M2, M3. Multiple sampling, i.e., A/D conversion, is performed by ramping $V_{ref}$ from $V_{min}$ to $V_{max}$ and ramping Bitline from 0 to 255 generated simultaneously by an on-chip counter. $V_{min}$ and $V_{max}$ are the respective minimum and maximum voltages on the diode. A 3T memory cell latches a digital count from the Bitline when $V_{ref}$ cross the diode voltage $V_{in}$ for each pixel.

During this A/D conversion time, the Enable signal is high, disables the self-reset feedback loop. During integration, Enable signal is low and $V_{ref}$ is set at $V_{min}$. Light induced photocurrent discharges the diode and $V_{in}$ continuously decreases until it reaches $V_{min}$. At this moment, the comparator flips and its output V1 goes low, which, in turn, turns on transistor M3 and V2 becomes high so that M4 resets the diode to $V_{max}$. After the reset, V1 becomes high again and M3 is off, very weakly biased transistor M1 gradually pull down V2 and finishes the self-reset.

Given the very high gain bandwidth of the comparator, this self-reset process only takes about several ns. Thus, the integration can be treated as continuous while the integrated photocharge is "flushed" from the diode capacitance. The occurrence of the self-reset can be detected by examining multiple sampling readout values, assuming there is at least one sample captured between two consecutive self-resets.

Figure 4:
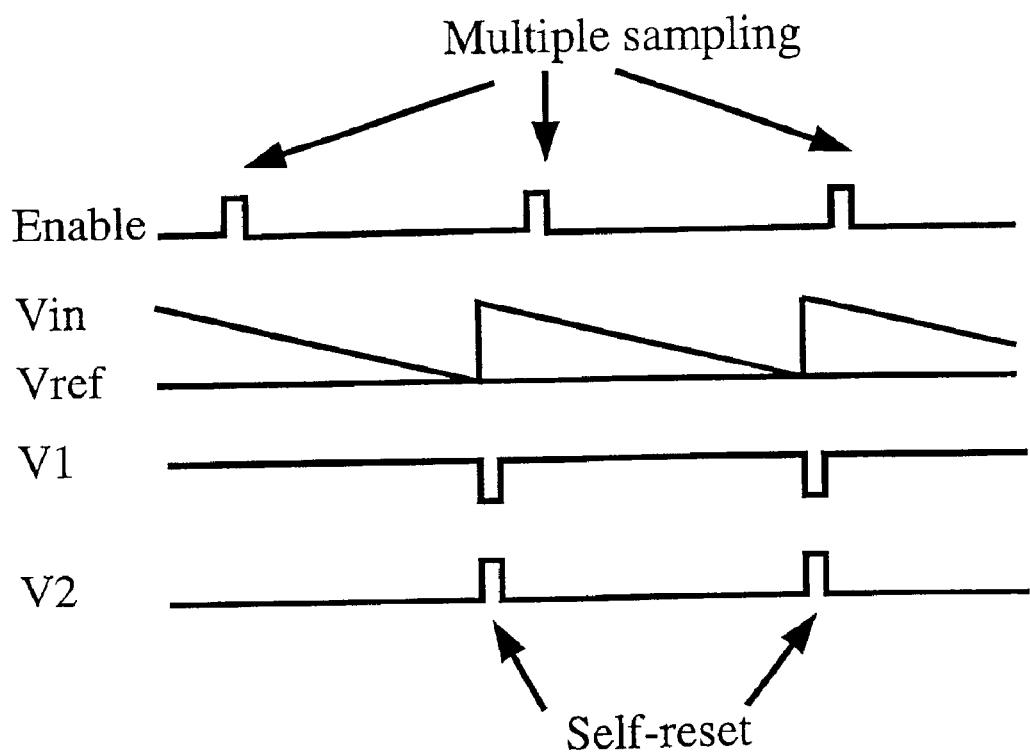
FIG. 4 is a timing diagram showing operation of a self-reset digital pixel sensor according to the present invention.

Referring now to FIG. 4, a self-reset digital pixel sensor timing diagram according to the present invention is presented. With the present invention's novel self-reset pixel architecture, effective well capacity is increased to approximately m times the physical well capacity $Q_{well}$ where m is the number of self-resets occurred. Maximum value of m is n−2 where n is the number of multiple sampling including one sampled at t=0.

Additional advantages of this novel architecture include: (1) relieving diode capacitance requirement, thereby providing possible further reductions in pixel size; (2) relaxing A/D conversion design challenge due to effective larger signal swing; and (3) eliminating the need to have blooming control.

Self-Reset Pixel Architecture with Modified Photocurrent Estimation

According to an aspect of the present invention, a novel photocurrent estimation method applying linear MSE estimation to multiple non-destructive samples improves image quality in CMOS DPS systems. In a preferred embodiment, such CMOS DPS systems employ self-reset DPS pixels, which add noise to the samples taken.

Taking into consideration the additional noise, it is preferred that the CMOS self-reset DPS architecture utilizes a modified photocurrent estimation algorithm as described herein to further reduce the noise.

Figure 5:
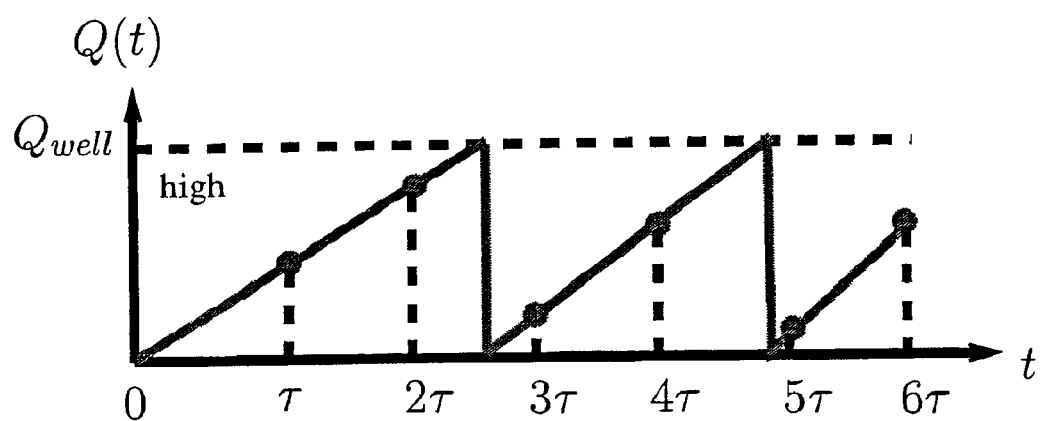
FIG. 5 is a timing diagram showing photocharge on a diode as a function of time for the self-reset pixel according to an aspect of the present invention.

Referring now to FIG. 5, where a timing diagram according to an aspect of the present invention shows integrated photocharge on the diode as function of time for the self-reset pixel. Assuming the (k+1)th pixel charge samples $Q_{k,m}$ captured at times $k_T$. The number of reset occurred during this time is m. Maximum value of m is n−2 where n is the number of multiple sampling includes the one sampled at t=0.

The (k+1)th charge sample is thus given by $$Q_{o,o} = V_o + G_o + F$$

$$Q_{k,m} = ik_T + \sum_{j=1}^{k} U_j + V_k + \sum_{j=0}^{m} G_j + (m+1)F, \ 0 \le k \le n,$$

where
$V_k$ represents readout noise of the kth sample;
$U_j$ represents shot noise generated during the time interval $((j-1)_T, j_T)$;
$G_j$ represents reset noise (KTC) generated during the jth self-reset; and
F represents fixed pattern noise (FPN).

The $U_j$'s, $V_k$, $G_j$, and F are independent zero mean random variables with $$E(V_k^2) = \sigma_V^2 > 0, \ \text{for } o \le k \le n,$$

$$E(U_j^2) = \sigma_U^2 = qi_T, \ \text{for } 1 \le j \le k, \ \text{and}$$

$$E(G_j^2) = \sigma_G^2,$$

$$F >> G_j,$$

Taking into consideration reset noise and offset FPN, $\tilde{I}_k$ is defined as $$\tilde{I}_{k,m} = \frac{Q_{k,m} - (m+1)Q_{o,o}}{k_T}, \ \text{for } 1 \le k \le n.$$

Preferably, at time $k_T$, the best unbiased linear mean-square-estimate of the parameter i given $\{\tilde{I}_{1,0}, \tilde{I}_{2,0}, \ldots, \tilde{I}_{k,m}\}$, i.e., coefficients $a_1, a_2, \ldots, a_k$ such that $$\hat{I}_k = \sum_{j=1}^{k} a_j \tilde{I}_{j,m},$$

minimizes $$\Phi_k^2 = E(\hat{I}_k - i)^2,$$

subject to $$E(\hat{I}_k) = i$$

In a preferred aspect of the present invention, the above estimation algorithm is restricted to recursive estimates, i.e., estimates of the form $$\hat{I}_k = \hat{I}^{k-1} + a_k(\hat{I}_{k,m} - \hat{I}_{k-1}),$$

and thus only a small amount of memory per pixel is required.

Figure 6:
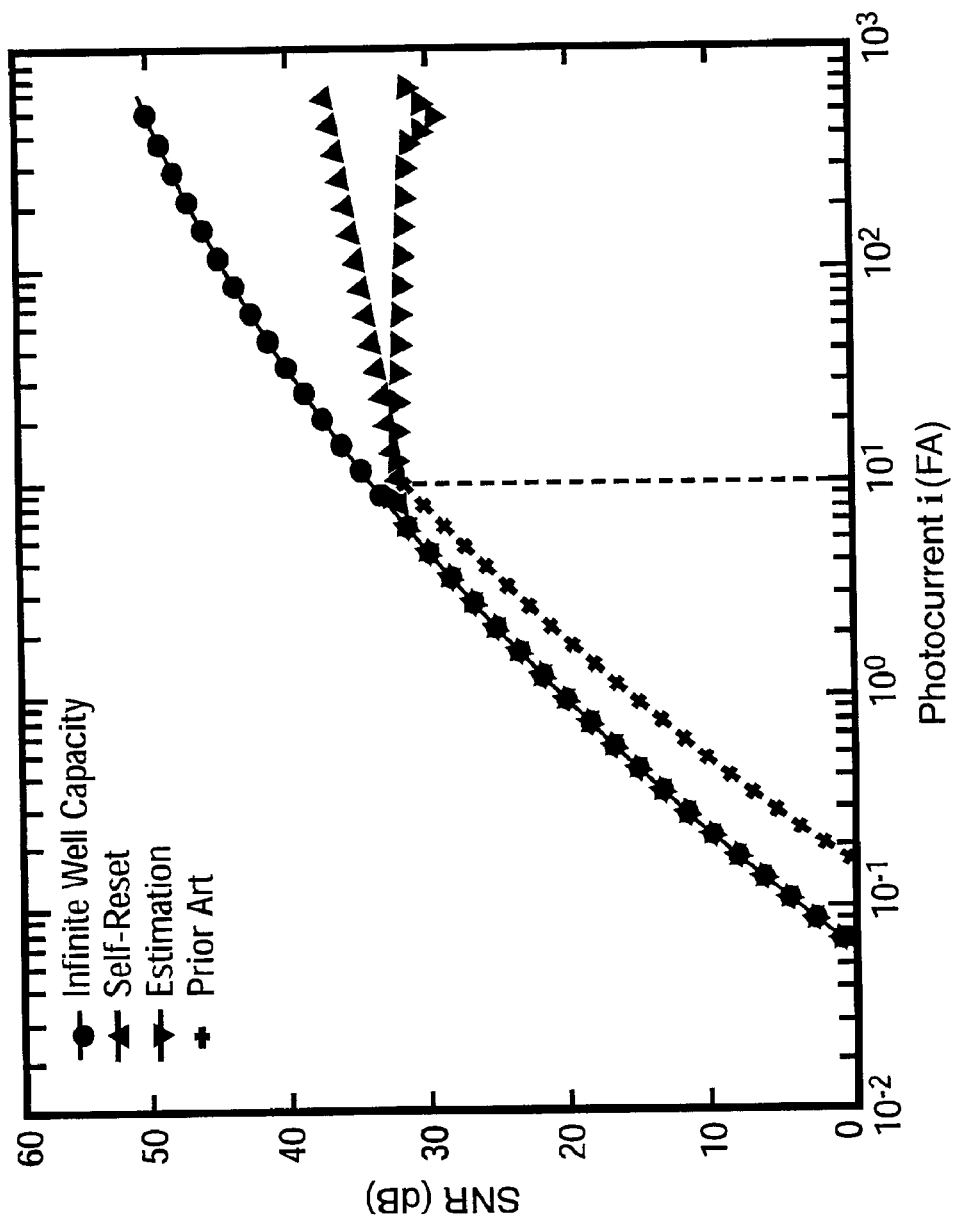
FIG. 6 is a diagram comparing different schemes according to the present invention.

FIG. 6 is a comparison diagram showing different implementations of the present invention as compared to a conventional implementation. Clearly, combining with multiple non-destructive captures, a self-reset DPS image sensor system according to the present invention would be much more desirable than conventional prior art CMOS APS image sensor systems due to increased peak SNR as well as enhanced dynamic range.

Under high illumination, the present novel self-reset DPS image sensor "recycles" the well during integration, thus resulting in higher effective well capacity, thereby providing higher SNR. The present invention provides SNR increase throughout the enhanced photocurrent range with 10 dB increase in peak SNR using 32 captures. Additionally, the present invention provides a recursive solution too, e.g., capturing a total of 128 samples with $Q_{well}=1875e^-$, readout noise $30e^-$, and reset noise $10e^-$.

Improving SNR under Low Illumination

Another aspect of the present invention provides a novel method of improving image quality for video sensors under low illumination. The technique extends the integration time of a video frame to be greater than video frame sampling time by eliminating the global reset at the beginning of each frame.

Extending the integration time dramatically improves the SNR for sensors under low illumination without slowing the video frame rate. Extending the integration time utilizing the novel CMOS self-reset DPS architecture greatly improves the SNR for sensors under low illumination without slowing the video frame rate and without sacrificing dynamic range.

As is well known in the art, solid state image sensors often have poor image quality under low illumination because the total amount of photocharge (signal) integrated on the photodiode is small relative to system noise. The sources of system noise generally include reset noise, readout noise and dark current shot noise. Hence, improving the SNR under low illumination is an important objective in designing a high quality imaging system. The most common way to accomplish this objective is to modify the CMOS process to reduce the dark current.

Figure 7:
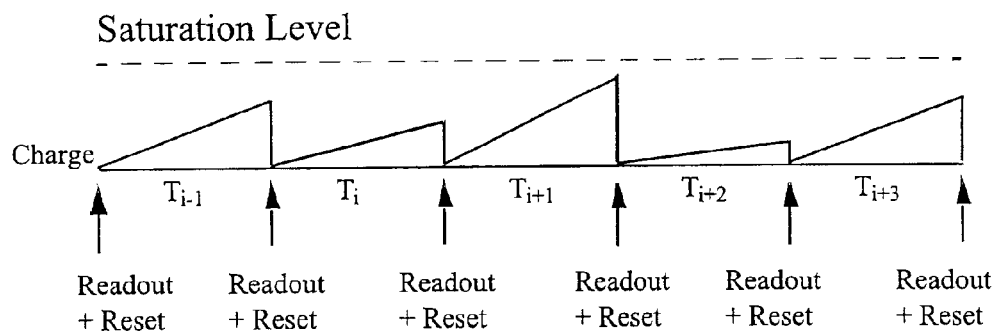
FIG. 7 is a timing diagram showing operation sequence of conventional sensors.

Referring now to FIG. 7, an operation sequence of conventional sensors in video mode is shown. The maximum frame integration time of the conventional sensors is set by the readout rate. As shown in FIG. 7, conventional image sensors perform a frame reset at the beginning of each new frame to prevent pixel saturation. This reset introduces reset noise, commonly quoted KT/C, and is a large source of noise at low illumination levels.

Another way to increase SNR of a low light signal is to provide longer sensor integration time. The SNR generally increases monotonically with increased integration time; however, the increase in integration time is restricted by the sampling time imposed by the frame rate. In other words, the integration time cannot be extended beyond the sampling time.

For example, CCD video sensors transfer the integrated charge following the acquisition of each frame, and this transfer destroys the accumulated charge. APS video sensors reset at the beginning of each frame to prevent pixel saturation, which also destroys the accumulated charge.

Furthermore, in fixed well capacity type sensors, as the integration time increases, the signal dynamic range decreases. This is because more dark charge shot noise is also being generated as the integration time increases.

Clearly, there is a need for a new way of improving the SNR for video sensors under low illumination without sacrificing dynamic range.

Figure 8:
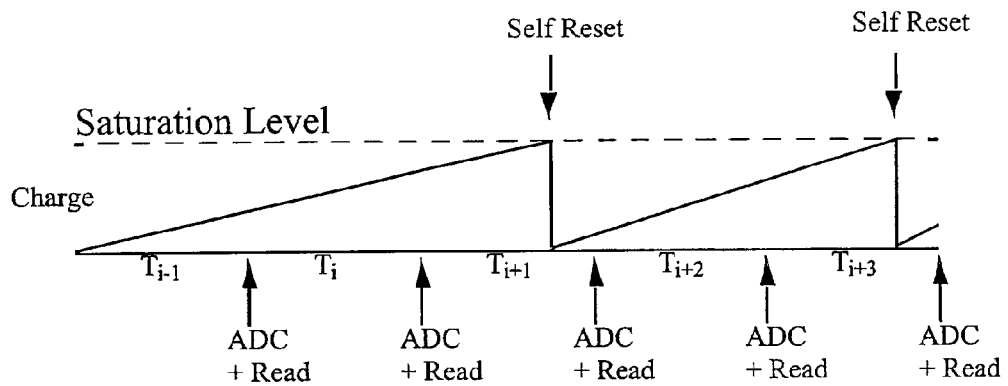
FIG. 8 is a timing diagram showing a novel operation sequence with self-reset sensors according to an embodiment of the present invention.

FIG. 8 illustrates a novel operation sequence according to an aspect of the present invention. Utilizing the novel self-reset digital pixel architecture of the present invention, the proportion of pixels that experience a reset prior to readout is reduced. In the novel operation sequence shown in FIG. 8, the global reset operation is eliminated for all pixels.

Since pixel saturation is not a concern for the novel CMOS self-reset DPS, a frame reset is not necessary as in the case of conventional image sensors. Accordingly, the frame reset for the whole pixel array at the beginning of each new frame can be eliminated. In other words, the proportion of pixels that experience a reset prior to readout is reduced. Since the reset noise is the largest noise source at low illumination, eliminating the frame reset also means that no such reset noise will be added to the signal. As a result, higher SNR is achieved.

Furthermore, in the novel method disclosed herein, the effective integration time, i.e., actual time spent in collecting the photocharge for each frame, can be extended beyond the frame time. This is achieved by subtracting an earlier than previous readout from the current readout. The time duration between the two readouts used could be multiples of frame time, or fractions of frame time if readouts happened more often than frame rate.

This increase in integration time increases the signal SNR and corresponding image quality. The self-reset sensor has the additional advantage that it does not lose dynamic range when the effective integration time of a signal is increased. The result is a wide dynamic range imager with high image quality under low illumination.

In FIG. 8, the periodical ADC and readout of sample values define each frame. The digitized charge residue from the previous frame is stored. Counting the total number of self-resets since the last read and adding the charge residue difference from current and previous frame determines the pixel intensity. Hence, the integrated charge in each pixel during time Ti is:

$$Q_{total,i} = nQ_{well} + Q_{residue,i} - Q_{residue,i-1}$$

Again, n is the number of self-resets occurred between the two frames. At low illumination situation, n equals zero for most of the frames.

The signal SNR at pixels without reset is:

$$SNR = \frac{Q_{total,i}^2}{qQ_{total,i} + qI_{dc}T_i}$$

The signal SNR at pixels with frame reset is:

$$SNR = \frac{Q_{total,i}^2}{qQ_{total,i} + qI_{dc}T_i + KTC}$$

Comparing these two SNR signals. The former one is higher because no KTC noise from reset is present. Since low illumination pixels reset less often than the global resetting in normal video mode operation, the readout scheme improves the SNR by eliminating the KTC reset noise. At low illumination, the reduced number of resets can improve SNR by about 5 dB, which is a very large amount.

For pixels with one self-reset, the SNR is the same as normal sensors. For bright pixels, the number of self-resets will exceed one. Although these pixels will have more noise, under normal operation these pixels would be saturated. The self-reset architecture thus offers wider dynamic range.

Utilizing charge integrated during multiple frames as the output at the end of each frame to generate the frame image, the present invention provides a novel method of obtaining measurements using temporal integration times that extend beyond the frame readout period. The method comprising steps of eliminating global frame reset for said pixels thereby extending integration time beyond frame readout time and generating a frame image using one or more previously stored frames. Note that under low illumination, the total number of self-resets would be less than the total number of extra frames, i.e., n<k.

On the other hand, longer integration time may cause motion blur in video imaging. The trade off between image SNR and temporal frequency response provides a guideline for finding an optimized number of integration periods. We recently proposed, in X. Liu and A. El Gamal, "Simultaneous Image Formation and Motion Blur Restoration via Multiple Capture", in IEEE International Conference on Acoustics, Speech, and Signal Processing 2001, Salt Lake City, Utah, May 2001, which is hereby incorporated herein by reference, motion detection algorithms that can detect the dramatic motion by analyzing captured frames. Thus, the novel method further provides a step of comprising a step of terminating extended integration time when dramatic motion is detected, thereby preventing severe motion blur.

Additionally, the optimized number is not limited to be integer values only, but could be any fractional number as well. In a case of integrating fractional frame time, extra A/C conversion operations in between frame times are required.

According to another aspect of the present invention, a method for improving SNR without reducing dynamic range in a CMOS video sensor system under low illumination, wherein the CMOS video sensor system employing self-reset DPS architecture including pixel level A/D conversion and wherein each DPS pixels capable of resetting itself whenever a corresponding diode reaches saturation during integration time, the method comprising steps of:
a) eliminating global frame reset;
b) capturing and storing a first frame;
c) determining photocurrent for said DPS pixels;
d) capturing and storing a next frame;
e) extending integration time beyond frame readout time;
f) analyzing captured frames to determine whether to terminate said extending step, wherein said extending step is terminated if motion blur is detected; and
g) generating frame image using number of self-resets occurred during said integration time and one or more previously stored frames.

According to another aspect of the invention, we include the method further comprising repeating steps d) through g) until all frames have been captured.

A novel self-reset DPS pixel architecture that recycles the limited well capacity to overcome the peak SNR deterioration problem when CMOS image sensor scales with the CMOS technology has been presented. With this new architecture, the effective well capacity is multiplied by the number of reset occurred and the peak SNR is enhanced by the same order.

Based on this new architecture, a novel recursive estimation algorithm exploits the high speed imaging capability of CMOS image sensors to enhance its dynamic range and SNR beyond the standard multiple capture scheme. Simulation result demonstrated a 10 dB gain at peak SNR when combine the self-reset and estimation algorithm together.

Although the present invention and its advantages have been described in detail, it should be understood that various changes, substitutions, and alternations could be made herein without departing from the principle and the scope of the invention. Accordingly, the scope of the present invention should be determined by the following claims and their legal equivalents.

We claim:
1. A self-reset digital pixel sensor (DPS), comprising:
a diode capable of collecting more charge than physical well capacity of said DPS;
a feedback circuit capable of effecting at least one self-reset during a single integration whenever said diode reaches saturation;
a digitizing means capable of providing pixel level analog-to-digital conversion (ADC) converting analog pixel signal to digital pixel value;
a memory means coupled to said digitizing means for storing said digital pixel value; and
a comparing means coupled to said feedback circuit, said digitizing means, and said memory means for facilitating said at least one self-reset and said pixel level ADC.

2. The DPS of claim 1, wherein said diode is capable of collecting a total charge of m times said physical well capacity $Q_{well}$, wherein m is number of self-reset during said integration determined by a counting means.

3. The DPS of claim 1, wherein said DPS capable of capturing multiple pixel samples during said integration and said digitizing means capable of providing multiple ADC.

4. The DPS of claim 3, wherein peak signal-to-noise ratio (SNR) of said DPS is not limited by said physical well capacity.

5. The DPS of claim 4, wherein said peak SNR is increased approximately m times said physical well capacity, wherein m is number of self-reset during said integration determined by a counting means.

6. The DPS of claim 3, further comprising means for providing photocurrent estimation to reduce read noise whereby dynamic range of said DPS is extended at both high and low illumination ends.

7. The DPS of claim 1, further comprising means for providing mean-square-error estimation to reduce noise whereby dynamic range of said DPS is extended at both high and low illumination ends.

8. The DPS of claim 1, wherein peak signal-to-noise ratio (SNR) of said DPS is not limited by said physical well capacity.

9. The DPS of claim 8, wherein said peak SNR is increased m times said physical well capacity, wherein m is number of self-reset during said integration determined by a counting means.

10. A self-reset digital pixel sensor (DPS) architecture with self-reset DPS for improving signal-to-noise ratio (SNR) and extending dynamic range, wherein said DPS architecture capable of capturing multiple pixel samples during a single integration, said architecture comprising:
a diode capable of collecting more charge than physical well capacity of said DPS;
a feedback circuit capable of effecting at least one self-reset during said integration whenever said diode reaches saturation;
a digitizing means capable of providing multiple pixel level analog-to-digital conversions (ADCs) for converting analog pixel signals to corresponding digital pixel values during said integration;
a memory means coupled to said digitizing means for storing said digital pixel values; and
a comparing means coupled to said feedback circuit, said digitizing means, and said memory means for facilitating said at least one self-reset and said ADCs.

11. The DPS architecture of claim 10, wherein said diode is capable of collecting a total charge of m times said physical well capacity $Q_{well}$, wherein m is number of self-reset during said integration determined by a counting means.

12. The DPS architecture of claim 10, wherein peak SNR of said DPS is not limited by said physical well capacity.

13. The DPS architecture of claim 12, wherein said peak SNR is increased approximately m times said physical well capacity, wherein m is number of self-reset during said integration determined by a counting means.

14. The DPS architecture of claim 10, further comprising means for providing linear mean-square-error estimation to reduce read noise whereby dynamic range of said DPS is extended at low illumination end.

15. A complementary metal oxide semiconductor (CMOS) image sensor system with self-reset digital pixel sensor (DPS) architecture for improving signal-to-noise ratio (SNR) and extending dynamic range, wherein said DPS architecture capable of capturing multiple pixel samples during a single integration, said CMOS image sensor system comprising:

at least one self-reset DPS pixel, said DPS pixel comprising:
a diode capable of collecting more charge than physical well capacity of said DPS;
a feedback circuit capable of providing at least one self-reset during said integration whenever said diode reaches saturation;
a digitizing means capable of providing multiple pixel level analog-to-digital conversions (ADCs) for converting analog pixel signals to corresponding digital pixel values during said integration;
a memory means coupled to said digitizing means for storing said digital pixel values; and
a comparing means coupled to said feedback circuit, said digitizing means, and said memory means for facilitating said at least one self-reset and said ADCs; and a counting means for determining number of self-reset occurred during said integration by analyzing number of pixel samples captured during said integration.

16. The CMOS image sensor system of claim 15, wherein said diode is capable of collecting a total charge of m times said physical well capacity $Q_{well}$, wherein m is said number of self-reset.

17. The CMOS image sensor system 15, wherein peak SNR of said DPS is not limited by said physical well capacity.

18. The CMOS image sensor system of claim 17, wherein said peak SNR is increased approximately m times said physical well capacity, wherein m is said number of self-reset.

19. The CMOS image sensor system of claim 15, further comprising means for providing mean-square-error estimation to reduce noise whereby dynamic range of said DPS is extended at low illumination end.

20. A method for simultaneously improving dynamic range and signal-to-noise (SNR) in a complementary metal oxide semiconductor (CMOS) image sensing system employing self-reset digital pixel sensor (DPS) architecture, wherein said self-reset DPS capable of resetting itself whenever said DPS reaches saturation during a single integration and wherein said self-reset DPS capable of collecting more charge than physical well capacity of said DPS, the method comprising the steps of:

capturing multiple pixel samples during said integration;

converting at pixel level captured analog pixel sample signals to corresponding digital pixel values;

storing said digital pixel values in memory;

obtaining at high speed said digital pixel values from said memory;

determining number of self-reset occurred during said integration by analyzing said digital pixel values;

determining total charge collected during said integration by analyzing said number of self-reset;

performing linear mean-square-error estimation to reduce noise associated with said capturing step thereby extending said dynamic range at low illumination end and increasing said SNR.

* * * * *